United States Patent
Kabe et al.

(10) Patent No.: US 8,617,029 B2
(45) Date of Patent: Dec. 31, 2013

(54) SHIFT CONTROL APPARATUS FOR CONTINUOUSLY VARIABLE TRANSMISSION

(71) Applicant: JATCO Ltd, Fuji (JP)

(72) Inventors: Tomoaki Kabe, Nagoya (JP); Nobuhiko Morifuji, Okazaki (JP); Keisuke Ichikawa, Nagoya (JP); Nobuhide Kato, Kariya (JP); Yuki Ono, Okazaki (JP); Hiromu Ogino, Yamato (JP); Yukinobu Sakakibara, Gamagori (JP); Hisao Nakanishi, Ichinomiya (JP); Takahiro Nakata, Mishima (JP); Mitsuki Ishizuka, Isehara (JP)

(73) Assignee: Jatco Ltd, Fuji-Shi (JP)

( * ) Notice: Subject to any disclaimer, the term of this patent is extended or adjusted under 35 U.S.C. 154(b) by 0 days.

(21) Appl. No.: 13/712,271

(22) Filed: Dec. 12, 2012

(65) Prior Publication Data
US 2013/0165296 A1   Jun. 27, 2013

(30) Foreign Application Priority Data
Dec. 26, 2011   (JP) .................. 2011-284077

(51) Int. Cl.
| B60W 10/04 | (2006.01) |
| B60W 10/10 | (2012.01) |
| G06F 7/00 | (2006.01) |
| G06F 17/00 | (2006.01) |
| G06F 19/00 | (2011.01) |

(52) U.S. Cl.
USPC ............................................ 477/37; 701/65

(58) Field of Classification Search
USPC .............. 477/37–49; 701/55, 64, 65
See application file for complete search history.

(56) References Cited

U.S. PATENT DOCUMENTS

| 4,976,170 A | 12/1990 | Hayashi et al. |
| 5,611,748 A | 3/1997 | Kashiwabara |
| 2003/0162633 A1 | 8/2003 | Nakayama et al. |
| 2005/0107935 A1 | 5/2005 | Herbster et al. |
| 2009/0319137 A1 | 12/2009 | Miyanoo |
| 2013/0138309 A1 | 5/2013 | Kabe et al. |

FOREIGN PATENT DOCUMENTS

| EP | 2 175 172 A1 | 4/2010 |
| JP | 2001099290 A * | 4/2001 |
| JP | 2005-164000 A | 6/2005 |

OTHER PUBLICATIONS

U.S. Appl. No. 13/712,259, filed Dec. 12, 2012, Kabe et al.
Notice of Allowance, dated Oct. 7, 2013, received in the co-pending U.S. Appl. No. 13/712,259.

* cited by examiner

*Primary Examiner* — Tisha Lewis
(74) *Attorney, Agent, or Firm* — Foley & Lardner LLP

(57) ABSTRACT

A shift control apparatus for continuously variable transmission includes: a pseudo accelerator opening degree generating section configured to generate a pseudo accelerator opening degree larger than the actual accelerator opening degree when the actual accelerator opening degree is decreased when the judging section judges that the vehicle runs the uphill; the target transmission gear ratio setting section being configured to set the target transmission gear ratio by the pseudo accelerator opening degree when the pseudo accelerator opening degree is inputted, and the shift control section being configured to control the shift toward the target transmission gear ratio set based on the pseudo accelerator opening degree and the vehicle speed when the pseudo accelerator opening degree is generated, and to control the shift toward the target transmission gear ratio set based on the actual accelerator opening degree and the vehicle speed when the pseudo accelerator opening degree is not generated.

8 Claims, 9 Drawing Sheets

SHIFT CONTROL APPARATUS FOR CONTINUOUSLY VARIABLE TRANSMISSION

BACKGROUND OF THE INVENTION

This invention relates to a shift control apparatus for a continuously variable transmission.

In a continuously variable transmission for a vehicle, there are a belt type continuously variable transmission, a troidal continuously variable transmission, and so on. A speed ratio of any of the transmission is controlled in accordance with a running state of the vehicle.

For example, the belt type continuously variable transmission includes a primary pulley, a secondary pulley, and a belt wound around the primary pulley and the secondary pulley. The belt type continuously variable transmission transmits a rotational driving force (torque) inputted to the primary pulley, through the belt to the secondary pulley while a transmission gear ratio is continuously varied by varying radii of the primary and secondary pulleys around which the belt is wound.

A shift control apparatus of the continuously variable transmission includes a shift diagram set based on simulations, tests and so on, and performs a shift control based on a shift line defined in this shift diagram.

For example, in case of the belt type continuously variable transmission, a target rotational speed of the primary pulley is set from the shift diagram based on the accelerator opening degree and the vehicle speed. A target transmission gear ratio (pulley ratio) is set from this set target rotational speed. The shift control apparatus controls the primary pulley and the secondary pulley so that groove widths of the primary pulley and the secondary pulley become groove widths to attain the set transmission gear ratio.

A Japanese Patent Application Publication No. 2005-164000 discloses a shift control apparatus for a continuously variable transmission which is configured to judge whether or not the driver has an acceleration intention based on an accelerator operation of the driver, to switch from a normal shift line to a shift line for the acceleration when it is judged that the driver has the acceleration intention, and to set the target transmission gear ratio based on the transmission line for the acceleration.

SUMMARY OF THE INVENTION

Even when the minute accelerator operation is performed, the continuously variable transmission immediately performs the shift to the transmission gear ratio determined from a shift line based on the accelerator opening degree after the operation. Accordingly, the continuously variable transmission can rapidly attain the appropriate transmission gear ratio according to the acceleration operation. Therefore, the continuously variable transmission is superior in the power performance (engine performance) and the fuel economy performance.

However, in the continuously variable transmission, the downshift and the upshift are linearly performed in accordance with the accelerator operation of the driver. Accordingly, the inconvenience may be caused due to the acceleration operation when the vehicle runs the uphill.

FIG. 9 is a view for illustrating a conventional shift control based on a shift diagram.

For example, the accelerator operation is performed at a curve in the middle of the uphill so that, while the vehicle runs the uphill while the driver depresses the accelerator pedal at accelerator opening degree TVa, the accelerator pedal is returned once to become accelerator opening degree TVb, and then depressed again.

In this case, the upshift is started at a timing at which the accelerator pedal is released. For example, when the timing at which the accelerator pedal is released is positioned at a position shown by a symbol P1 in FIG. 9, the upshift toward a position P2 on shift line TVb which corresponds to the accelerator opening degree after the release of the accelerator pedal is started.

Then, when the accelerator pedal is depressed again and the accelerator opening degree is returned to, for example, accelerator opening degree TVa after the upshift toward the position P2 on shift line TVb is finished, the downshift toward position P1 on shift line TVa is started at the timing at which the accelerator pedal is depressed again if the vehicle speed is not varied.

Consequently, the target rotational speed of the primary pulley (the engine speed) is increased by the start of the downshift. However, the engine speed is increased from the state where the engine speed is decreased by the upshift. Accordingly, the driver gets a feeling that the increase of the vehicle speed is slow, relative to the increase of the engine speed. The driver feels slippage feeling with respect to the shift behavior of the continuously variable transmission. The driver may feel the unnatural feeling with respect to the driving feeling.

Therefore, in the conventional apparatus, when the upshift is started while the vehicle runs the uphill, a lower limit of the rotational speed of the primary pulley in the upshift (the lower limit restriction line in FIG. 9) is set so that the rotational speed of the primary pulley does not become smaller than the lower limit. With this, the upshift is restricted in order to solve the above-described problem.

By the above-described countermeasure, even when the upshift from the position P1 to the position P2 in the drawing is started by the above-described accelerator operation, the upshift is restricted at a position P3 crossing the lower limit restriction line. Accordingly, the target rotational speed of the primary pulley (the engine speed) is not decreased than N3.

Consequently, when the accelerator pedal is then depressed again and the downshift is started, it is possible to further rapidly approach the target rotational speed N1. Therefore, it is possible to decrease the slippage feeling of the driver with respect to the shift behavior. The driver is less likely to feel the unnatural feeling with respect to the driving feeling.

However, in a case where the above-described countermeasure is employed, the minimum rotational speed of the primary pulley is restricted irrespective of the accelerator operation of the driver.

Consequently, for example, when the accelerator opening degree when the accelerator pedal is depressed again is, for example, accelerator opening degree TVc smaller than the accelerator opening degree when the accelerator pedal is released, the target rotational speed of the primary pulley (N2 in FIG. 9) which is determined from accelerator opening degree TVc after the depression becomes smaller than the rotational speed (N3 in FIG. 9) which is defined by the lower limit line.

In this case, the target rotational speed of the primary pulley (the engine speed) becomes higher than the rotational speed which the driver intends, so that the driver may get a feeling that the engine sound is noisy.

Therefore, in the conventional apparatus, the minimum rotational speed of the primary pulley (the lower limit restriction line) is set to the lower value for preventing the above-described inconvenience. When the above-described accelerator operation is performed, the countermeasure against the above-described driving feeling is not positively taken.

It is, therefore, an object of the present invention to provide a shift control apparatus for a continuously variable transmission devised to improve a shift behavior of the automatic transmission when a vehicle runs an uphill, and to decrease an unnatural feeling of a driver with respect to the shift behavior.

According to one aspect of the present invention, a shift control apparatus for a continuously variable transmission of a vehicle which is configured to continuously vary a rotational driving force of an engine that is inputted to an input side rotational member, and to transmit the varied rotational driving force to an output side rotational member, the shift control apparatus comprises: a target transmission gear ratio setting section configured to set a target transmission gear ratio based on an actual accelerator opening degree which is identified from an output signal of an accelerator operation amount sensor, and a vehicle speed; a shift control section configured to control a shift of the continuously variable transmission toward the target transmission gear ratio; a judging section configured to judge whether or not the vehicle runs an uphill; and a pseudo accelerator opening degree generating section configured to generate a pseudo accelerator opening degree which is larger than the actual accelerator opening degree when the actual accelerator opening degree is decreased when the judging section judges that the vehicle runs the uphill, and to output the pseudo accelerator opening degree to the target transmission gear ratio setting section, the target transmission gear ratio setting section being configured to set the target transmission gear ratio by using the pseudo accelerator opening degree when the pseudo accelerator opening degree is inputted, and the shift control section being configured to control the shift of the continuously variable transmission toward the target transmission gear ratio set based on the pseudo accelerator opening degree and the vehicle speed when the pseudo accelerator opening degree is generated, and to control the shift of the continuously variable transmission toward the target transmission gear ratio set based on the actual accelerator opening degree and the vehicle speed when the pseudo accelerator opening degree is not generated.

DETAILED DESCRIPTION OF THE INVENTION

Figure 1:
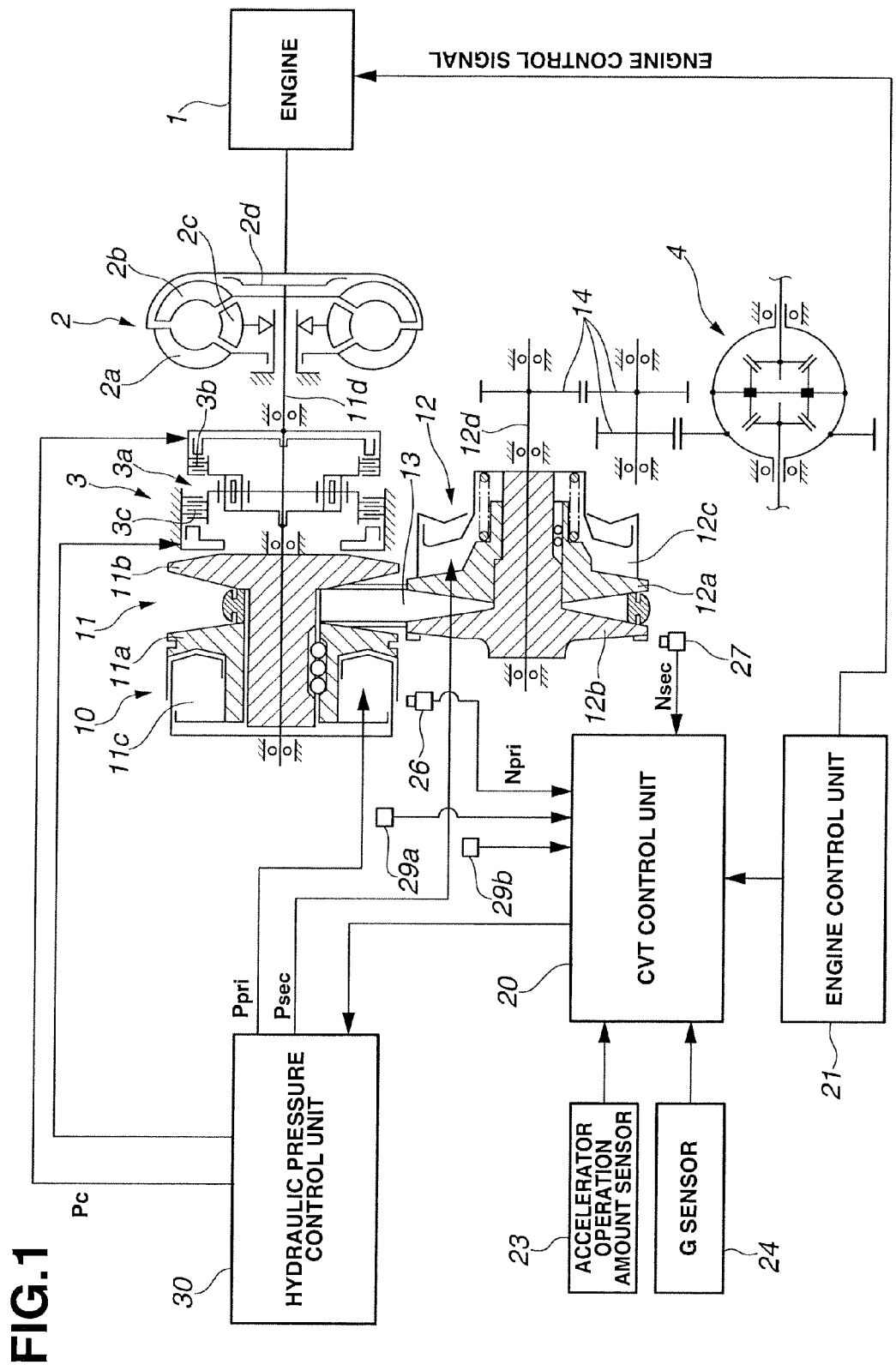
FIG. 1 is a schematic configuration view showing a belt type continuously variable transmission for a vehicle according to one embodiment of the present invention.

Hereinafter, a belt type continuously variable transmission according to one embodiment of the present invention will be illustrated.

Belt-type continuously variable transmission 10 includes a primary pulley 11, a secondary pulley 12, a V belt 13, a CVT control unit 20, and a hydraulic pressure control unit 30.

Primary pulley 11 is disposed coaxially with an engine 1. A torque converter 2 and a forward-reverse switching mechanism 3 are disposed in this order from an engine 1's side, between an engine 1 and primary pulley 11.

Torque converter 2 includes a pump impeller 2a connected with an output shaft of engine 1, a turbine runner 2b connected with an input shaft of forward-reverse switching mechanism 3, a stator 2c, and a lockup clutch 2d.

Forward-reverse switching mechanism 3 includes, as a main component, a double pinion planetary gear set 3a. This double pinion planetary gear set 3a includes a sun gear connected with turbine runner 2b of torque converter 2, and a carrier connected with primary pulley 11. Forward-reverse switching mechanism 3 further includes a start clutch 3b directly connecting between the sun gear and the carrier of double pinion planetary gear set 3a, and a reverse brake 3c arranged to fix a ring gear. When start clutch 3b is engaged, an input rotation from engine 1 through torque converter 2 is directly transmitted to primary pulley 11. When reverse brake 3c is engaged, the input rotation from engine 1 through torque converter 2 is reversed, and this reversed rotation is transmitted to primary pulley 11.

Primary pulley 11 is a pulley which is on an input shaft side, and which inputs the rotation of engine 1 to belt type continuously variable transmission 10. Primary pulley 11 includes a fixed conical disc (plate) arranged to rotate as a unit with an input shaft 11d, and a movable conical disc (plate) which is disposed to confront this fixed conical disc 11b to form a V-shaped pulley groove, and which is arranged to be moved in an axial direction by a hydraulic pressure (primary pressure Ppri) acted to a primary pulley cylinder chamber 11c. Primary pulley 11 receives a rotation driving force of engine 1 through forward-reverse switching mechanism 3 and torque converter 2. A rotational speed of primary pulley 11 is sensed by a primary pulley rotational speed sensor 26.

A secondary pulley 12 includes a fixed conical disc (plate) 12b arranged to rotate as a unit with an output shaft 12d, and which is disposed to confront this fixed conical disc 12b to form a V-shaped pulley groove, and which is arranged to be moved in an axial direction by a hydraulic pressure (secondary pressure Psec) acted to a secondary pulley cylinder chamber 12c.

Secondary pulley 12 is connected through an idler gear 14 and an idler shaft to a differential (gear) 4. Secondary pulley 12 outputs an rotation transmitted by V belt 13 to differential 4.

A rotational speed of secondary pulley 12 is sensed by a secondary pulley rotational speed sensor 27.

V belt 13 is wound around primary pulley 11 and secondary pulley 12. V belt 13 transmits the rotation of primary pulley 11 to secondary pulley 12.

CVT control unit 20 determines a target pulley ratio and a contact frictional force of V belt 13. CVT control unit 20 outputs a command to hydraulic pressure unit 30, and controls continuously variable transmission 10. In this case, a pulley ratio is obtained by dividing an effective radius of secondary pulley 12 by an effective radius of primary pulley 11. The pulley ratio has the same meaning of the transmission gear ratio.

Moreover, CVT control unit 20 outputs a command to hydraulic pressure control unit 30 so as to control engagements and disengagements of frictional engagement elements (start clutch 3b and reverse brake 3c) of forward-reverse switching mechanism 3, and an engagement and a disengagement of lockup clutch 2d of torque converter 2.

Hydraulic pressure control unit 30 controls the hydraulic pressure (primary pressure Ppri) acted to primary pulley cylinder chamber 11c of primary pulley 11, and the hydraulic pressure (secondary pressure Psec) acted to secondary pulley cylinder chamber 12c, based on a command from CVT control unit 20.

In the belt type continuously variable transmission 10, the rotation inputted to primary pulley 11 is transmitted through V belt 13 to secondary pulley 12. When primary pulley 11 and secondary pulley 12 are rotated, movable conical disc 11a and movable conical disc 12a are moved back and forth (reciprocate) in a direction of a rotation shaft in accordance with the primary pressure and the secondary pressure.

When movable conical disc 11a and movable conical disc 12a are moved, pulley groove widths are varied, so that the V belt 13 is moved in the radial direction on primary pulley 11 and secondary pulley 12. With this, the contact radiui of V belt 13 with respect to primary pulley 11 and secondary pulley 12 are continuously varied. The pulley ratio and the contact frictional force of V belt 13 are controlled to values determined in accordance with the primary pressure and the secondary pressure.

Moreover, hydraulic pressure control unit 30 controls a hydraulic pressure (Pc) supplied to forward-reverse switching mechanism, based on the command from CVT control unit 20 so as to engage and disengage the frictional engagement elements (start clutch 3b and reverse brake 3c).

CVT control unit 20 receives signals from engine control unit 21, an accelerator operation amount sensor 23, primary pulley rotational speed sensor 26, secondary pulley rotational speed sensor 27, and hydraulic pressure sensors 29a and 29b.

Engine control unit 21 outputs information of an input torque (torque information) inputted from engine 1 to belt type continuously variable transmission 10, to CVT control unit 20.

Accelerator operation amount sensor 23 outputs, to CVT control unit 20, a signal indicative of an operation amount (accelerator opening degree To) of an accelerator pedal (not shown), and a signal indicative of a variation rate (accelerator depression speed Tv) of the operation amount of the accelerator pedal.

A G sensor 24 is a sensor arranged to sense a gradient (inclination) of the vehicle. G sensor 24 outputs a signal indicative of an amount of the inclination of the vehicle with respect to a horizontal plane (surface), to CVT control unit 20.

Primary pulley rotational speed sensor 26 outputs a signal (Npri) indicative of the rotational speed of primary pulley 11, to CVT control unit 20.

Secondary pulley rotational speed sensor 27 outputs a signal (Nsec) indicative of the rotational speed of secondary pulley 12, to CVT control unit 20.

Besides, CVT control unit 20 calculates an actual pulley ratio (speed ratio), based on the signal (Npri) indicative of the rotational speed of primary pulley 11, and the signal (Nsec) indicative of the rotational speed of secondary pulley 12. Moreover, CVT control unit 20 identifies (specifies) the speed of the vehicle (vehicle speed) by the signal (Nsec) indicative of the rotational speed of secondary pulley 12.

Hydraulic pressure sensor 29a outputs a signal indicative of the hydraulic pressure (primary pressure Ppri) acted to primary pulley cylinder chamber 11c, to CVT control unit 20.

Hydraulic pressure sensor 29b outputs a signal indicative of the hydraulic pressure (secondary pressure Psec) acted to secondary pulley cylinder chamber 12c, to CVT control unit 20.

Figure 2:
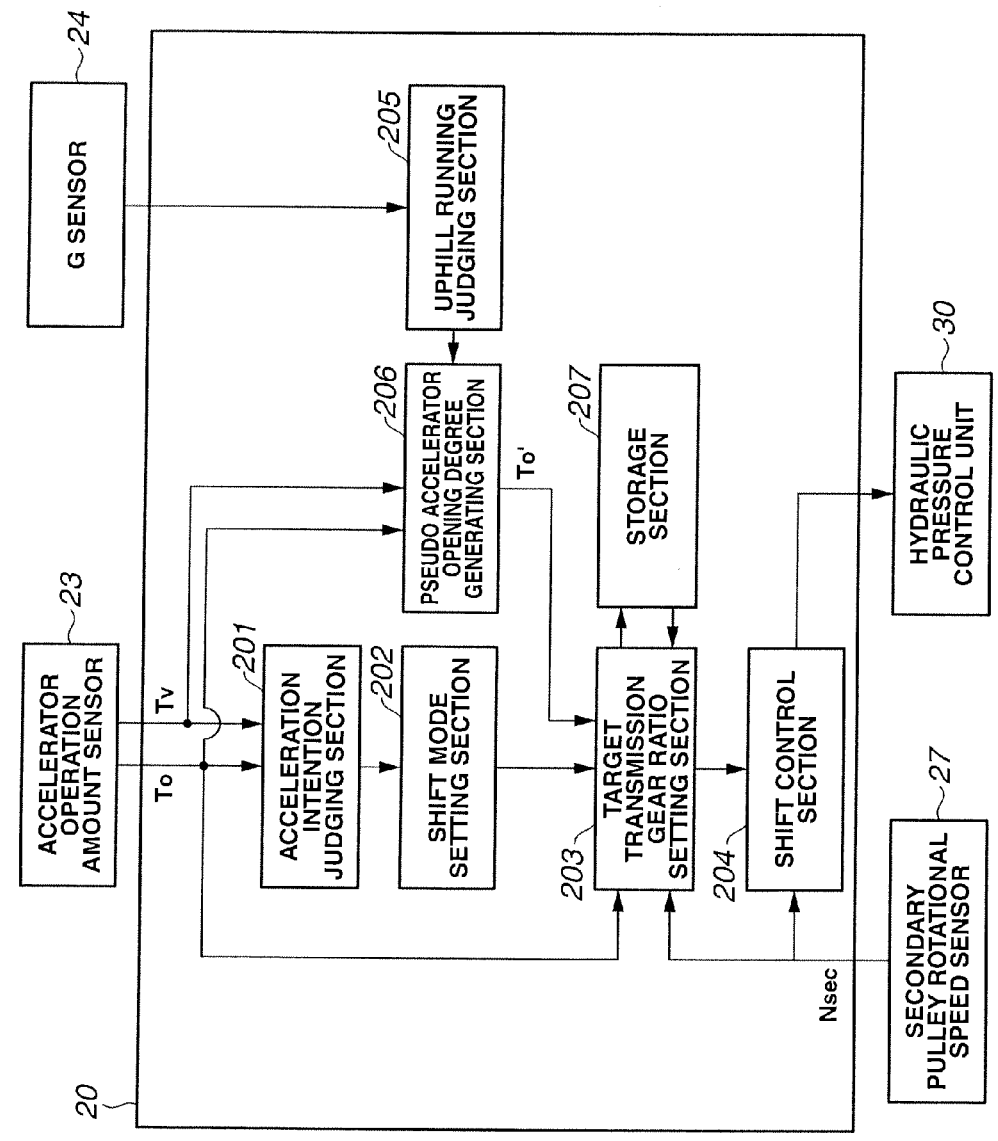
FIG. 2 is a block diagram showing a CVT control unit according to the one embodiment of the present invention.

FIG. 2 is a block diagram of CVT control unit 20.

As shown in FIG. 2, CVT control unit 20 includes an acceleration intention judging section 201, a shift mode setting section 202, a target transmission gear ratio setting section 203, a shift control section 204, an uphill running judging section 205, a pseudo accelerator opening degree generating section 206, and a storage section 207.

Acceleration intention judging section 201 judges whether or not the driver has an acceleration intention, based on accelerator opening degree To and accelerator depression speed Tv.

In this embodiment, a map data (mode judgment map) which defines a relationship between accelerator opening degree To and acceleration depression speed Tv, and a normal mode and an acceleration mode is prepared at each vehicle speed V. Acceleration intention judging section 201 judges whether or not the driver has the acceleration intention with reference to (by referring to) the mode judgment map determined in accordance with the vehicle speed at the present time, based on accelerator opening degree To and accelerator depression speed Tv.

Besides, the mode judgment map is stored in storage section 207 of CVT control unit 20.

Shift mode setting section 202 is configured to set the shift mode of the continuously variable transmission. Shift mode setting section 202 is configured to set the shift control of the continuously variable transmission to the acceleration mode when acceleration intention judging section 201 judges that the driver has the acceleration intention, and to set the shift control of the continuously variable transmission to the normal mode when the acceleration intention judging section 201 judges that the driver does not have the acceleration intention.

Figure 3:
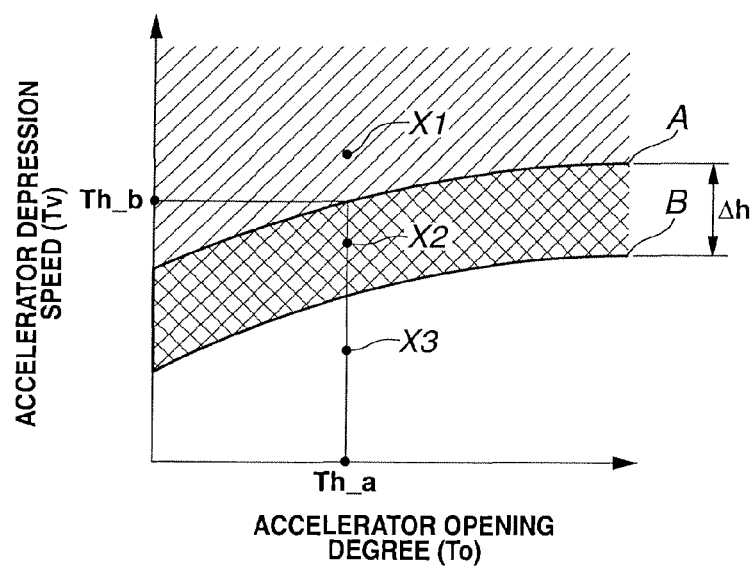
FIG. 3 is a view illustrating one example of a mode judgment map.

FIG. 3 is a view for illustrating one example of a mode judgment map.

The mode judgment map shown in FIG. 3 defines a relationship between a threshold value for judging a transition from a normal mode to an acceleration mode and a threshold value for judging a transition from the acceleration mode to the normal mode, and accelerator opening degree To and accelerator depression speed Tv.

A symbol A in FIG. 3 is an acceleration mode transition judgment line connecting the threshold values for judging the transition from the normal mode to the acceleration mode. A symbol B in FIG. 3 is a normal mode transition judgment line connecting the threshold values for judging the transition from the acceleration mode to the normal mode.

For example, in case of the normal mode, when the accelerator opening degree To and the accelerator depression speed Tv at the present time are positioned at a position shown by a symbol X1 in FIG. 3, acceleration intention judging section 201 judges that the driver has the acceleration intention. Shift mode setting section 202 sets the shift control of the continuously variable transmission to the acceleration mode.

Moreover, in case of the normal mode, when the accelerator opening degree To and the accelerator depression speed Tv at the present time are positioned at a position shown by a symbol X2 in FIG. 3, acceleration intention judging section 201 judges that the driver does not have the acceleration intention. Shift mode setting section 202 sets the shift control of the continuously variable transmission to the normal mode, so that the normal mode is continued.

Furthermore, in case of the acceleration mode, when accelerator opening degree To and acceleration depression speed Tv at the present time are positioned at the position shown by symbol X2 in FIG. 3, shift mode setting section 202 continues the acceleration mode. Moreover, in case of the acceleration mode, when accelerator opening degree To and acceleration depression speed Tv at the present time are positioned at a position shown by a symbol X3 in FIG. 3, the acceleration mode is finished, and the normal mode is set.

Besides, in the mode judgment map, acceleration mode transition judgment line A and normal mode transition judgment line B are apart from each other by Ah for preventing the frequent switching between the acceleration mode and the normal mode.

Target transmission gear ratio setting section 203 sets the target rotational speed of the primary pulley with reference to (by referring to) a map (shift diagram) of the shift mode which is set at the present time, based on accelerator opening degree To and vehicle speed V. Target transmission gear ratio setting section 203 determines the target transmission gear ratio (the target pulley ratio) from the set target rotational speed of the primary pulley.

The shift diagrams to which the target transmission gear ratio setting section 203 is referred is stored in storage section 207. Storage section 207 stores the dedicated (special) shift diagram for each of the shift mode (the shift diagram for the normal mode, and the shift diagram for the acceleration mode).

Figure 4A:
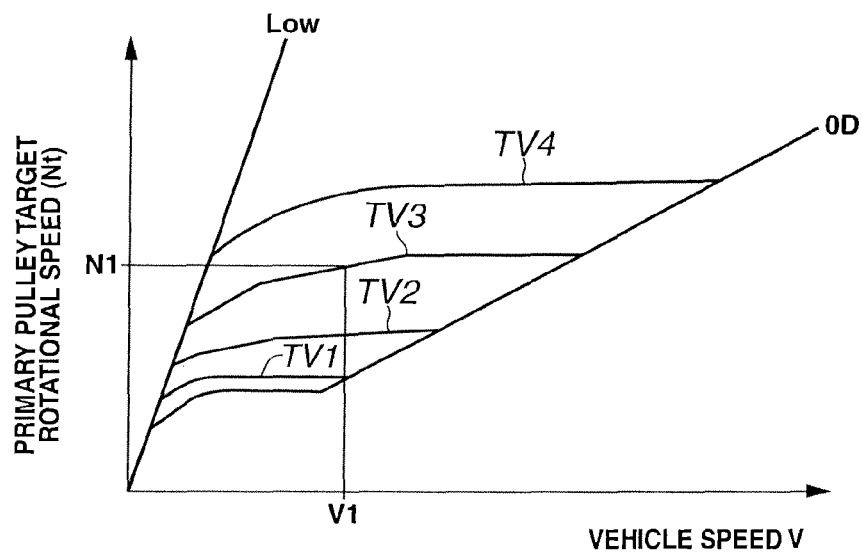
FIGS. 4A and 4B are views illustrating a shift diagram.
Figure 4B:
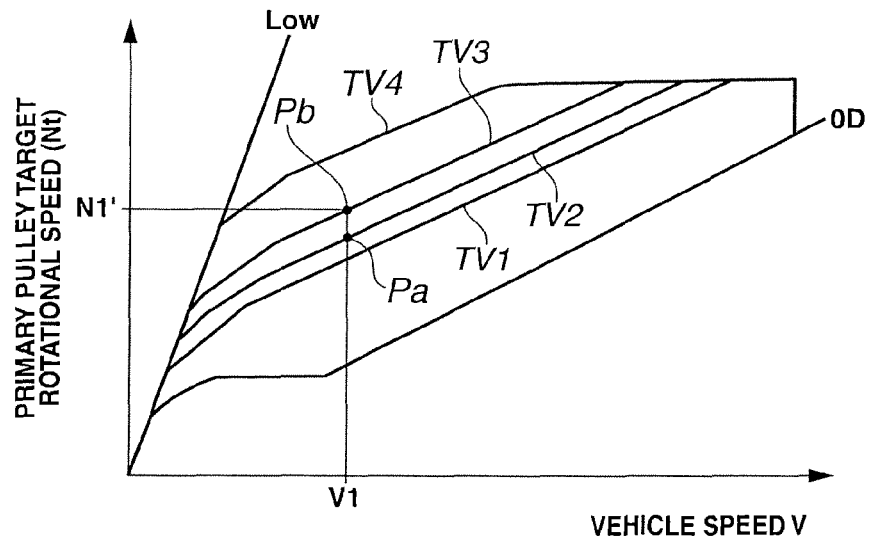

FIGS. 4A and 4B are views for illustrating the shift diagram. FIG. 4A is the shift diagram for the normal mode. FIG. 4B is the shift diagram for the acceleration mode.

In the shift diagram, a plurality of characteristic lines (TV1-TV4) corresponding to the accelerator opening degree which is increased or decreased in accordance with the depression amount of the accelerator pedal are set between a characteristic line Low in which the transmission gear ratio is maximized, and a characteristic line OD in which the transmission gear ratio is minimized. Target rotational speed Nt of the primary pulley is determined by referring to this shift diagram based on vehicle speed V and accelerator opening degree To.

In the shift diagram (cf. FIG. 4B) for the acceleration mode, target rotational speed Nt of the primary pulley is set to the higher rotation side than that of the shift diagram (cf. FIG. 4A) for the normal mode. In the downshift in the acceleration mode, target rotational speed Nt of the primary pulley becomes higher than that in the downshift in the normal mode, so that the torque inputted from the engine is set to become large.

For example, when the accelerator opening degree is TV3 and the vehicle speed is V1, target rotational speed N1' of the primary pulley which is determined from the shift diagram for the acceleration mode is set to become the higher rotation than target rotational speed N1 of the primary pulley which is determined from the shift diagram for the normal mode.

Accordingly, when it is judged that the driver has the acceleration intention at the vehicle speed V1 and the acceleration mode is set, at that time, the target rotational speed of the primary pulley is set based on the shift diagram for the acceleration mode. Consequently, the target rotational speed of the primary pulley becomes N1'. This target rotational speed N1' is a rotational speed higher than the target rotational speed N1 in the shift diagram of the normal mode. At the timing at which the acceleration mode is started, the downshift is started.

Shift control section 204 outputs, to hydraulic pressure control unit 30, a command to vary the transmission gear ratio (the pulley ratio) at the present time toward the target transmission gear ratio (the pulley ratio) by the set shift speed, and controls the primary pulley and the secondary pulley to attain the target transmission gear ratio.

Uphill running judging section 205 judges whether or not the vehicle runs the uphill based on the output signal of G sensor 24. Uphill running judging section 205 outputs the judgment result to pseudo accelerator opening degree generating section 206.

In particular, uphill running judging section 205 calculates a road gradient based on the output signal of G sensor 24. Uphill running judging section 205 judges that the vehicle runs the uphill when the calculated road gradient is equal to or greater than a predetermined gradient (for example, +5%). When uphill running judging section 205 judges that the vehicle runs the uphill, uphill running judging section 205 outputs the judgment result and the calculated road gradient to pseudo accelerator opening degree generating section 206.

Pseudo accelerator opening degree generating section 206 generates a pseudo accelerator opening degree To' which is decreased by a variation rate that is smaller (slower) than the variation rate of the actual accelerator opening degree, when the accelerator opening degree is decreased when it is judged that the vehicle runs the uphill. Pseudo accelerator opening degree generating section 206 outputs this pseudo accelerator opening degree to target transmission gear ratio setting section 203.

Hereinafter, pseudo accelerator opening degree To' generated by pseudo accelerator opening degree generating section 206 is illustrated with reference to FIG. 5.

Figure 5A:
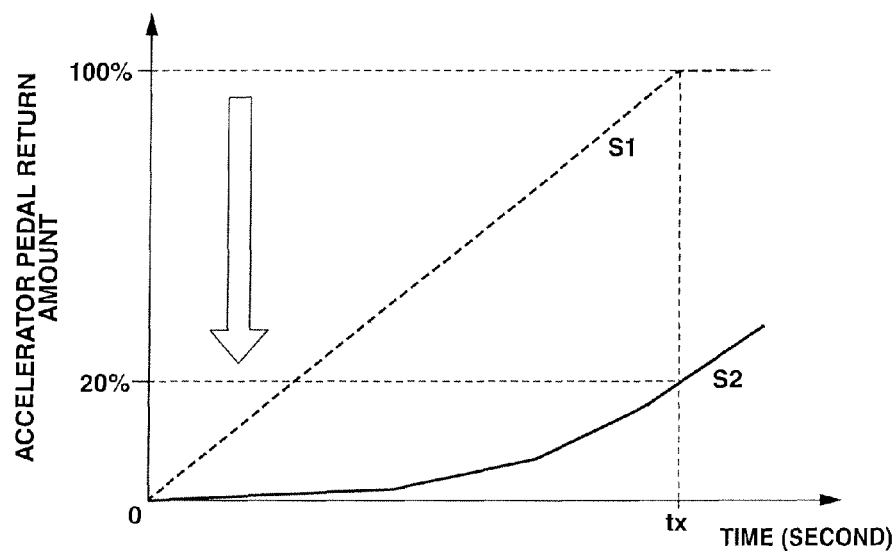
FIGS. 5A and 5B are views for illustrating a pseudo accelerator opening degree.

For example, when the accelerator pedal is returned during a predetermined time period tx (for example, one second) to 100%, output signal S1 of accelerator operation amount sensor 23 is varied as shown by a dotted line in FIG. 5A. In this case, this output signal S1 corresponds to a locus (trajectory) of the variation of the actual accelerator opening degree during predetermined time period tx.

In this embodiment, when the accelerator pedal is returned, pseudo accelerator opening degree generating section 206 determines a gradual return amount of the variation rate of the accelerator opening degree, based on the road gradient, and the actual accelerator opening degree at the timing at which the accelerator pedal is returned.

For example, in a case where it is determined that it is pseudoly considered that the accelerator pedal is returned to 20% during predetermined time period tx (for example, one second), pseudo accelerator opening degree generating section 206 generates a pseudo signal S2 to make out (fake) that the accelerator opening degree is slowly returned to 20% during predetermined time period tx, as shown by a solid line in FIG. 5A.

Accordingly, the accelerator opening degree identified from this pseudo signal S2 (hereinafter, referred to as the pseudo accelerator opening degree) becomes larger than the actual accelerator opening degree identified from output signal S1 of accelerator operation amount sensor 23.

Figure 5B:
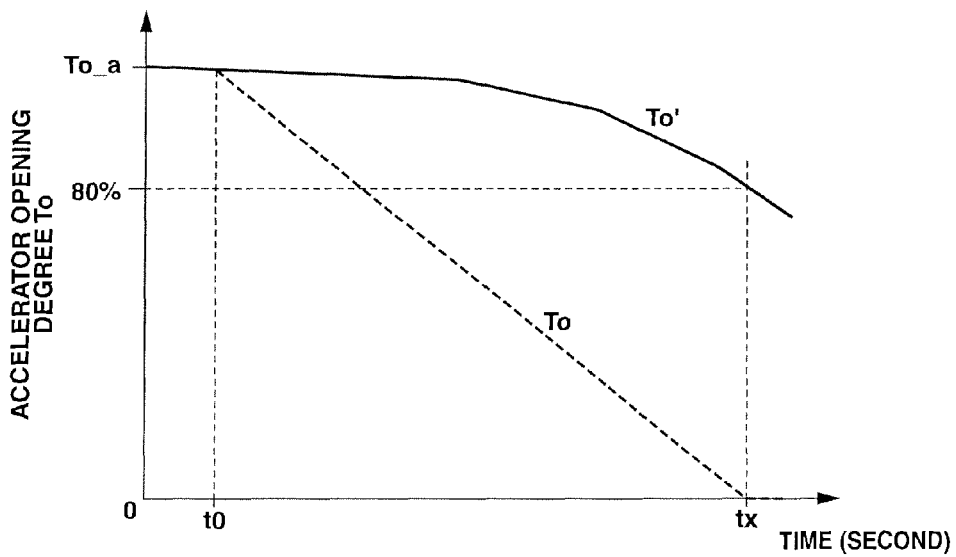

For example, when the accelerator pedal is returned to 100% from time t0 at which the vehicle runs at accelerator opening degree To_a as shown in FIG. 5B, pseudo accelerator opening degree To' at the timing at which predetermined time period tx (for example, 1 second) elapsed from the timing at which the accelerator pedal is returned is 80% of the accelerator opening degree (To_a) at time t0, as shown by a solid line in FIG. 5B. This is larger than actual accelerator opening degree To at that time (0 in case of FIG. 5B).

In this embodiment, the above-described target transmission gear ratio setting section 203 sets the target rotational speed of the primary pulley, and the target transmission gear ratio, based on actual accelerator opening degree To identified from the output signal of accelerator operation amount sensor 23, and vehicle speed V.

In this case, in a case where pseudo accelerator opening degree To' identified from the pseudo signal is used, the target rotational speed of the primary pulley which is determined by using pseudo accelerator opening degree To' is set to the rotational speed higher than the target rotational speed of the primary pulley which is determined by using actual accelerator opening degree To, since pseudo accelerator opening degree To' is larger than actual accelerator opening degree To. Moreover, the target transmission gear ratio determined by using pseudo accelerator opening degree To' becomes larger than the target transmission gear ratio determined by using actual accelerator opening degree To.

In this embodiment, when actual accelerator opening degree To is decreased when it is judged that the vehicle runs the uphill, the target transmission gear ratio is set by using pseudo accelerator opening degree To'. In this case, pseudo accelerator opening degree To' is decreased at the variation rate which is smaller (slower) than the variation rate of actual accelerator opening degree To. The variation rate of the transmission gear ratio at the upshift performed in this case is slower than the variation of the transmission gear ratio at the upshift performed based on actual accelerator opening degree To. That is, the upshift is performed so that the target rotational speed of the primary pulley (the engine speed) is not largely decreased during the short time period.

Hereinafter, the operation in CVT control unit 20 in this embodiment is illustrated.

Figure 6:
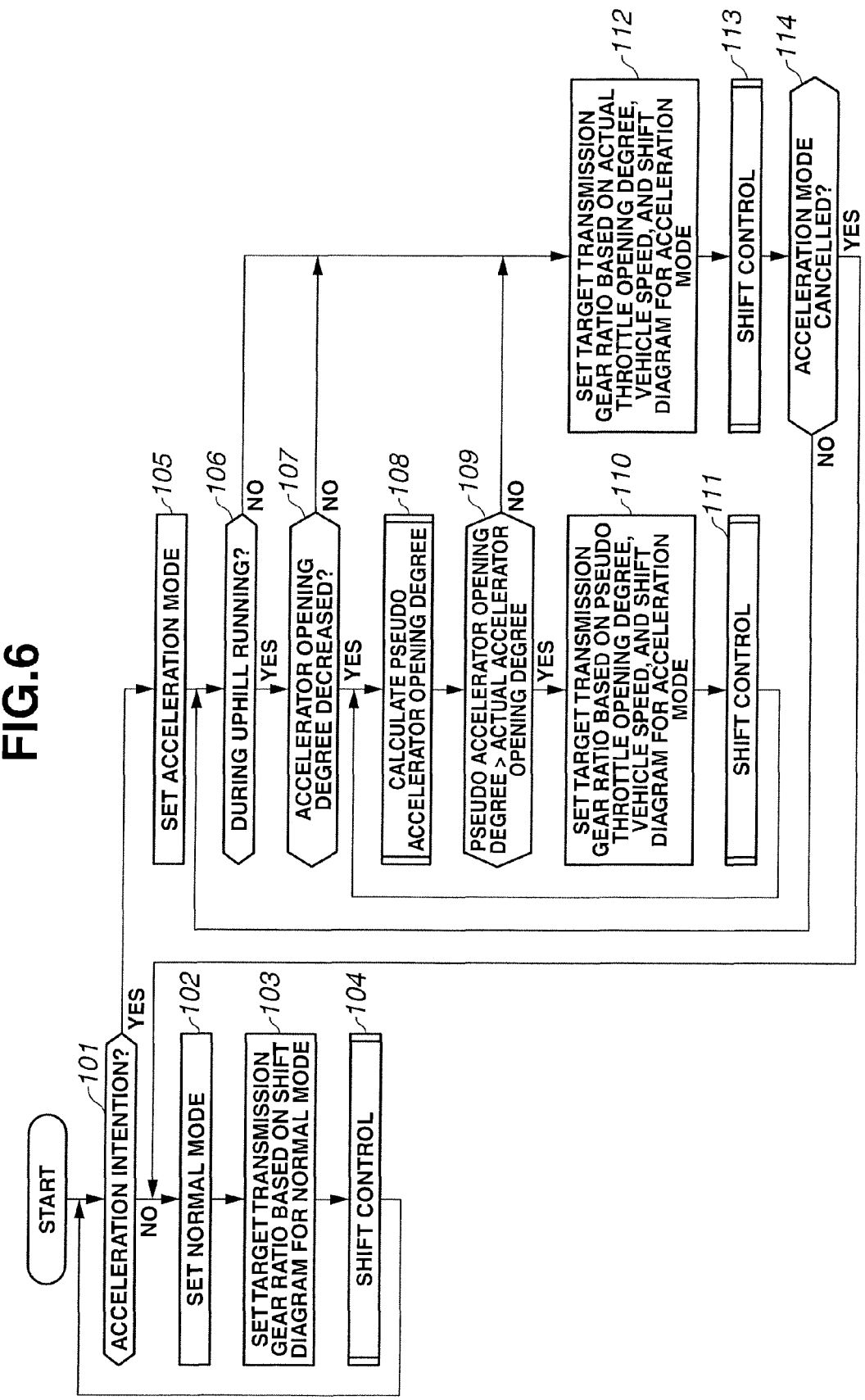
FIG. 6 is a flowchart for illustrating an operation in the CVT control unit.

FIG. 6 is a flowchart for illustrating the shift control operation performed in CVT control unit 20.

Besides, in below illustrations, the shift control operation other than portions relating to the main part according to the present invention is briefly illustrated.

In continuously variable transmission 10 according to the embodiment, there are prepared the normal mode and the acceleration mode for the shift control of the continuously variable transmission. In the acceleration mode, target rotational speed Nt of the primary pulley is set to the higher rotation side than that in the normal mode so as to attain the driving performance which has the priority in the acceleration performance.

In continuously variable transmission 10, the shift control of the continuously variable transmission is performed, in principle, in the normal mode. Then, when it is judged that the acceleration operation of the driver is the operation to require the acceleration of the vehicle, the acceleration mode is set. The shift control is performed in the acceleration mode.

Therefore, at step 101, it is judged whether or not the accelerator operation of the driver is the operation to require the acceleration of the vehicle, that is, whether or not the driver has the acceleration intention.

In particular, it is judged whether or not accelerator opening degree To at the present time is equal to or greater than a predetermined value Th_a, and whether or not accelerator depression speed Tv is equal to or greater than a predetermined value Th_b.

In this case, predetermined value Th_a is a value defined in the map with respect to vehicle speed V at the present time. Predetermined value Th_b is a value defined in the map with respect to the vehicle speed V at the present time, and accelerator opening degree To at the timing at which the accelerator pedal is depressed.

The depression amounts of the accelerator pedal (accelerator opening degrees To) at the high vehicle speed and at the low vehicle speed when the vehicle is accelerated are different from each other. Moreover, the depression speeds Tv of the accelerator pedal at that time are different from each other in accordance with the accelerator opening degree To at that time. Accordingly, in this embodiment, predetermined value Th_a is defined in the map with respect to vehicle speed V. Predetermined value Th_b is defined in the map with respect to vehicle speed V and accelerator opening degree To.

In general, when the driver has the acceleration intention, the accelerator pedal is depressed. Accordingly, at step 101, it is judged whether or not the driver has the acceleration intention based on a condition that accelerator opening degree To becomes equal to or greater than predetermined value Th_a (To≥Th_a), and a condition that accelerator depression speed Tv at that time becomes equal to or greater than predetermined value Th_b (Tv≥Th_b).

In this embodiment, in the above-described mode judgment map (cf. FIG. 3), the relationship between predetermined value Th_a of accelerator opening degree To and predetermined value Th_b of accelerator depression speed Tv is defined by acceleration mode transition judgment line A. When predetermined value Th_a of accelerator opening degree To is determined in accordance with vehicle speed, predetermined value Th_b of accelerator depression speed Tv is found (determined) from this mode judgment map.

Accordingly, for example, when accelerator opening degree To and accelerator depression speed Tv at the present time are positioned at the position shown by the symbol X1 in FIG. 3, the conditions of To≥Th_a and Tv≥Th_b are satisfied, and acceleration intention judging section 201 judges that the driver has the acceleration intention.

When the answer of step 101 is negative (NO) and it is judged that the driver does not have the acceleration intention, the process proceeds to step 102. At step 102, shift mode setting section 202 sets the shift control of continuously variable transmission 10 to the normal mode.

In this case, when the normal mode has been already set as the mode of the shift control, the normal mode is continuously set.

Subsequently to step 102, at step 103, target transmission gear ratio setting section 203 reads the shift diagram (cf. FIG. 4A) for the normal mode from storage section 207, and sets the parameters for the shift control based on the shift diagram for the normal mode.

In particular, target transmission gear ratio setting section 203 sets the target rotational speed of the primary pulley at the present time, and the target transmission gear ratio at the present time, with reference to the shift diagram for the normal mode based on vehicle speed V and accelerator opening degree To at the present time.

For example, in case of FIG. 4A, when vehicle speed V at the present time is V1 and accelerator opening degree To is TV3, the target rotational speed of the primary pulley is set to N1.

Subsequently to step 103, at step 104, shift control section 204 determines the primary pressure and the secondary pressure from the transmission gear ratio (the actual transmission gear ratio) at the present time, for performing the shift to the target transmission gear ratio set at step 103, and outputs a command to attain the determined primary pressure and the determined secondary pressure, to hydraulic pressure control unit 30.

Accordingly, hydraulic pressure control unit 30 continuously varies the contact radii of V belt 13 with respect to primary pulley 11 and secondary pulley 12, so that the pulley ratio and the frictional force of V belt 13 are controlled to the values determined in accordance with the primary pressure and the secondary pressure.

With this, when the actual transmission gear ratio is continuously varied toward the target transmission gear ratio and the actual transmission gear ratio finally becomes equal to the target transmission gear ratio, the shift control at step 104 is finished.

After the operation of step 104 is finished, the process returns to the operation of step 101. At step 101, it is judged whether or not the driver has the acceleration intention, and the shift control according to the judgment result is performed.

On the other hand, when the answer of step 101 is affirmative (YES) and it is judged that the driver has the acceleration intention, the process proceeds to step 105. At step 105, shift mode setting section 202 sets the shift control of continuously variable transmission 10 to the acceleration mode.

In this case, when the normal mode has been already set as the mode of the shift control, the mode is switched to the acceleration mode in which the target rotational speed of the primary pulley is set to the higher rotation side than that of the normal mode.

Subsequently to the setting of the acceleration mode at step 105, the process proceeds to step 106. At step 106, uphill running judging section 205 checks whether or not the vehicle runs the uphill.

In particular, uphill running judging section 205 calculates the inclination of the vehicle (the road gradient), based on the output signal of G sensor 24. For example, when the calculated road gradient is equal to or greater than +5%, uphill running judging section 205 judges that the vehicle runs the uphill.

Then, when uphill running judging section 205 judges that the vehicle runs the uphill, uphill running judging section 205 outputs the judgment result that the vehicle runs the uphill, and the calculated road gradient, to pseudo accelerator opening degree generating section 206.

Subsequently to the judgment that vehicles runs the uphill at step 106, the process proceeds to step 107. At step 107, pseudo accelerator opening degree generating section 206 checks whether or not accelerator opening degree To is decreased by the return of the accelerator pedal.

In particular, pseudo accelerator opening degree generating section 206 judges that the accelerator opening degree is decreased when accelerator opening degree To at the present time becomes smaller than accelerator opening degree To at the timing (step 101) at which the driver has the acceleration intention.

Subsequently to the judgment that the accelerator opening degree is decreased at step 107, the process proceeds to step 108. At step 108, pseudo accelerator opening degree generating section 206 calculates pseudo accelerator opening degree To'.

Figure 7:
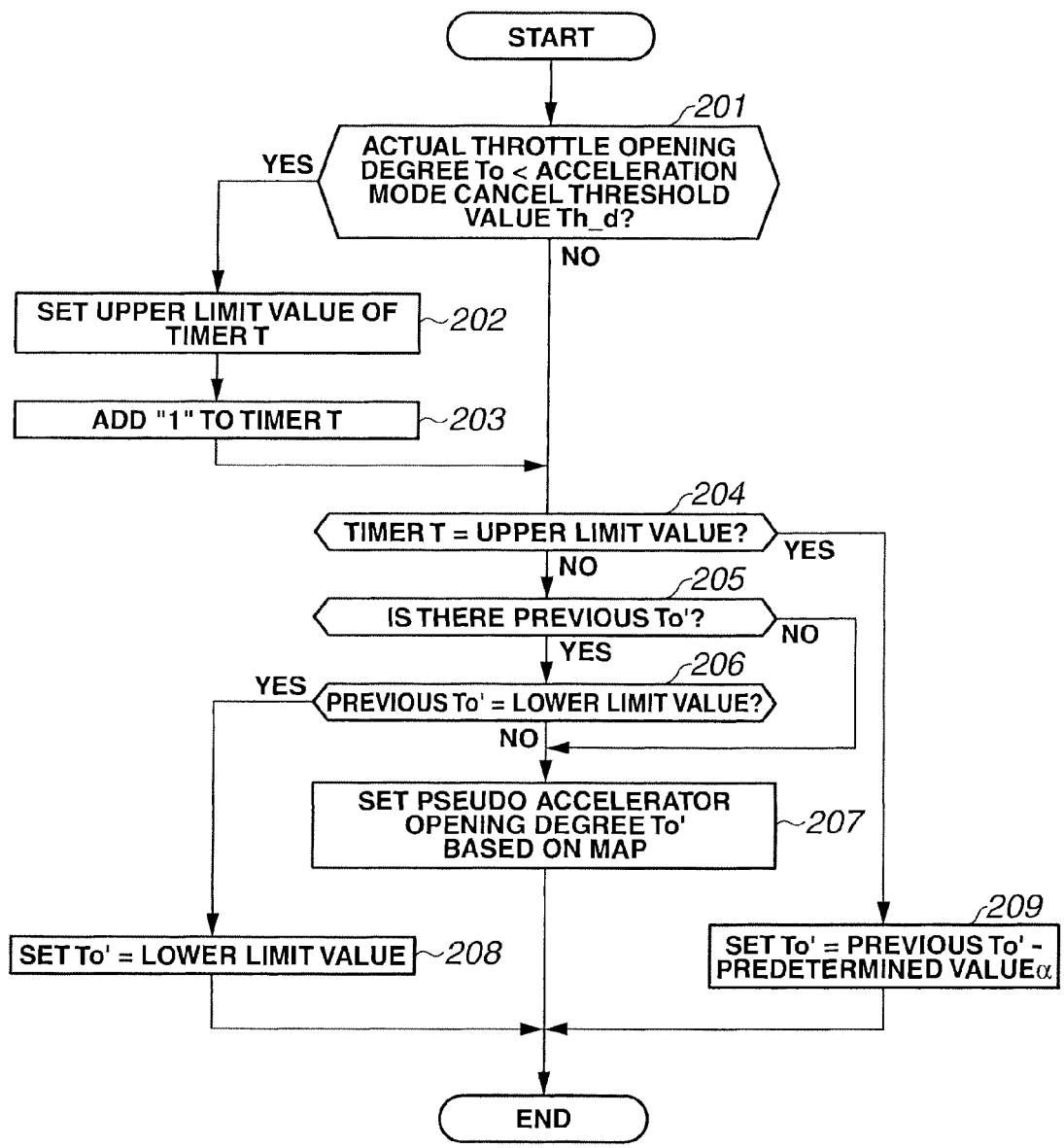
FIG. 7 is a flowchart for illustrating the operation in the CVT control unit.

FIG. 7 is a flowchart for illustrating the calculation of the pseudo accelerator opening degree.

In this embodiment, when the accelerator opening degree is decreased by the return of the accelerator pedal when the vehicle runs the uphill, pseudo accelerator opening degree generating section 206 generates the pseudo signal to make out (fake) that the accelerator opening degree is decreased at the variation rate slower than the variation rate of the actual accelerator opening degree. Target transmission gear ratio setting section 203 sets the target transmission gear ratio based on the accelerator opening degree (the pseudo accelerator opening degree To') identified from the pseudo signal.

In this case, the pseudo accelerator opening degree identified from the pseudo signal is slowly decreased from the timing at which the accelerator pedal is returned, relative to the actual accelerator opening degree. After the pseudo accelerator opening degree reaches a predetermined lower limit value, the pseudo accelerator opening degree is held to the lower limit value. When a predetermined time period elapses from a timing at which the actual accelerator opening degree becomes smaller than a threshold value (acceleration mode cancel threshold value) for judging the cancel of the acceleration mode, this pseudo accelerator opening degree is decreased from that time toward the actual accelerator opening degree.

In this embodiment, the calculation of the pseudo accelerator opening degree is performed by a calculation operation of the pseudo accelerator opening degree in FIG. 7.

Hereinafter, the calculation operation of the pseudo accelerator opening degree is illustrated.

First, at step 201, it is judged whether or not the accelerator opening degree (actual accelerator opening degree To) at the present time is smaller than the predetermined value (acceleration mode cancel threshold value) Th_d for judging the cancel of the acceleration mode (To<Th_d).

When the answer of step 201 is affirmative (YES) (actual accelerator opening degree To is smaller than acceleration mode cancel threshold value Th_d (To<Th_d)), the process proceeds to step 202. At step 202, an upper limit value of a timer T is set. Subsequently to step 202, the process proceeds to step 203. At step 203, "1" is added to timer T.

In case of the normal control, when actual accelerator opening degree To becomes smaller than acceleration mode cancel threshold value Th_d, the driving state of the automatic transmission is switched from the acceleration mode to the normal mode at that time.

In this embodiment, even when the accelerator opening degree becomes smaller than acceleration mode cancel threshold value Th_d by the return of the accelerator pedal when the vehicle runs the uphill, the control mode is not immediately switched to the normal mode. Until the timer T becomes the upper limit value set at step 202 (the upper limit time period elapses), the acceleration mode continues in preparation for the depression of the accelerator pedal once again.

Besides, the upper limit value of timer T is defined in the map with respect to the road gradient, and accelerator opening degree To at the timing at which the accelerator pedal is returned (FIG. 6, step 107).

In this embodiment, for example, the value of timer T is set to reach the upper limit value by the time period during which the vehicle running the uphill enters a curve and moves out of the curve (the time period from a timing at which the vehicle running the uphill enters a curve to a timing at which the vehicle moves out of the curve).

When it is judged that actual accelerator opening degree To is not smaller than acceleration mode cancel threshold value Th_d (To≥Th_d), or when "1" is added to timer T at step 203, pseudo accelerator opening degree generating section 206 checks whether or not the timer value reaches the upper limit value at step 204.

When the value of timer T does not reach the upper limit value (the answer of step 204 is negative (NO)), pseudo accelerator opening degree generating section 206 checks whether or not there is the pseudo accelerator opening degree at the previous time for checking whether or not the present time is in the middle of the upshift based on the pseudo accelerator opening degree.

In this embodiment, when the upshift based on the pseudo accelerator opening degree is started, the pseudo accelerator opening degree is calculated from the pseudo signal for setting the target transmission gear ratio.

This calculated pseudo accelerator opening degree is used for the calculation of a new pseudo accelerator opening degree when a predetermined condition is satisfied.

Accordingly, in this embodiment, for example, storage section 207 stores the calculated pseudo accelerator opening degree, as the pseudo accelerator opening degree at the previous time, for using for the calculation of the new pseudo accelerator opening degree.

The pseudo accelerator opening degree stored in storage section 207 is renewed by a newly-calculated pseudo accelerator opening degree at each timing when the new pseudo accelerator opening degree is calculated. The pseudo accelerator opening degrees stored in storage section 207 are deleted at the timing at which the upshift based on the pseudo accelerator opening degree is finished.

Accordingly, when storage section 207 does not store the pseudo accelerator opening degree at the previous time (when the answer of step 205 is negative (NO)), the present time is not in the middle of the upshift based on the pseudo accelerator opening degree. The present time is a timing immediately after the accelerator pedal is returned when the vehicle runs the uphill.

In this case, the process proceeds to step 207. Pseudo accelerator opening degree generating section 206 calculates the initial pseudo accelerator opening degree.

In particular, pseudo accelerator opening degree generating section 206 obtains (reads), from storage section 207, the map (for example, FIG. 5) determined in accordance with the road gradient and the accelerator opening degree at the timing when the accelerator pedal is returned. Pseudo accelerator opening degree generating section 206 calculates the pseudo accelerator opening degree at the present time, based on the obtained map.

On the other hand, when there is the pseudo accelerator opening degree at the previous time at step 205 (when the answer of step 205 is affirmative (YES)), the present time is in the middle of the upshift based on the pseudo accelerator opening degree. In this case, the process proceeds to step 206. At step 206, pseudo accelerator opening degree generating section 206 checks whether or not the pseudo accelerator opening degree at the previous time is lower limit value opening degree (the lower limit value) Th_f.

In this case, lower limit value opening degree Th_f is a predetermined value determined in accordance with the road gradient and the accelerator opening degree at the timing when the accelerator pedal is returned.

As described above, in this embodiment, when the accelerator pedal is returned while the vehicle runs the uphill in the acceleration mode, the pseudo accelerator opening degree at that time can be calculated (determined) from the pseudo signal by which the accelerator opening degree is decreased at the variation rate which is slower than the variation rate of the actual accelerator opening degree.

However, in a case where the accelerator opening degree at the timing at which the accelerator pedal is returned is small, even when the pseudo accelerator opening degree is slowly decreased by the pseudo signal, the pseudo accelerator opening degree may become the value (for example, 0 (zero)) identical to the actual accelerator opening degree, during the short time period.

In this case, the effect by using the pseudo accelerator opening degree is not attained irrespective of using the pseudo accelerator opening degree which is greater than the actual accelerator opening degree since the downshift which is started when the accelerator pedal is depressed again is finished, during the shorter time period.

Therefore, in this embodiment, when the pseudo accelerator opening degree which is decreased at the variation rate which is slower than the variation rate of the actual accelerator opening degree reaches lower limit value opening degree Th_f which is greater than the actual opening degree, the pseudo accelerator opening degree is held to lower limit value opening degree Th_f.

Accordingly, when the pseudo accelerator opening degree at the previous time is not lower limit value opening degree Th_f at step 206 (the answer of step 206 is negative (NO)), the present time is in the middle of the decrease of the pseudo accelerator opening degree.

In this case, the process proceeds to step 207. At step 207, the pseudo accelerator opening degree at the present time is set.

In particular, the new pseudo accelerator opening degree is set based on the map (for example, FIG. 5) read from storage section 207 when the operation of step 207 is firstly performed through step 205, and the elapsed time period from the timing at which the accelerator pedal is returned.

Besides, the pseudo accelerator opening degree may be lower limit value opening degree Th_f in accordance with the elapsed time period, in the operation of step 207 at the present time (this time).

On the other hand, when the pseudo accelerator opening degree at the previous time is the lower limit value opening degree Th_f at step 206 (when the answer of step 206 is affirmative (YES)), that lower limit value opening degree Th_f is directly set as the pseudo accelerator opening degree To' at the present time (without change).

Accordingly, in this embodiment, the pseudo accelerator opening degree To' at the present time is set by the operation of step 207 through step 206 at each timing when the calculation of the pseudo accelerator opening degree of FIG. 7 is performed, until pseudo accelerator opening degree To' becomes equal to lower limit value opening degree Th_f.

Then, after pseudo accelerator opening degree To' becomes lower limit value opening degree Th_f, the pseudo accelerator opening degree at the present time is set by the operation of step 208 through step 206.

When the predetermined time period elapses from the timing at which actual accelerator opening degree To becomes smaller than acceleration mode cancel threshold value Th_d, at the above-described step 204, (the value of) timer T reaches the upper limit value (the answer of step 204 is affirmative (YES)).

In this case, the process proceeds to step 209. At step 209, pseudo accelerator opening degree generating section 206 sets the value obtained by subtracting a predetermined value α from the pseudo accelerator opening degree To' at the previous time, as the pseudo accelerator opening degree To' at the present time.

In this embodiment, when the predetermined time period elapses from the timing at which actual accelerator opening degree To becomes smaller than acceleration mode cancel threshold value Th_d, pseudo accelerator opening degree To' is set to approach the actual accelerator opening degree To by predetermined amount α, for finishing the setting of the target transmission gear ratio based on pseudo accelerator opening degree To'.

As described above, pseudo accelerator opening degree To' is the value larger than actual accelerator opening degree To. Accordingly, when the pseudo accelerator opening degree To' is varied to actual accelerator opening degree To at the same timing when the predetermined time period elapses, the accelerator opening degree used for the setting of the target transmission gear ratio is suddenly varied. The target rotational speed of the primary pulley and the target transmission gear ratio is suddenly varied, so that the sudden upshift is performed.

Therefore, in this embodiment, pseudo accelerator opening degree To' is set to gradually approach actual accelerator opening degree To. With this, it is possible to prevent the sudden variation of the target rotational speed of the primary pulley and the sudden variation of the target transmission gear ratio, and thereby to prevent the sudden upshift.

Besides, in this embodiment, at the timing at which the predetermined time period elapses from the timing at which actual accelerator opening degree To becomes smaller than acceleration mode cancel threshold value Th_d, the setting of target rotational speed of the primary pulley and the target transmission gear ratio based on the pseudo accelerator opening degree To' is finished. The finish timing of the setting of the target transmission gear ratio using pseudo accelerator opening degree to' is determined for preventing that the vehicle cannot stop by continuing pseudo accelerator opening degree To to be held to the lower limit value opening degree Th_f, for example, when the accelerator pedal is returned for stopping the vehicle.

In this way, when pseudo accelerator opening degree To' is set at one of steps 207, 208, and 209, the calculation operation of the pseudo accelerator opening degree of FIG. 7 is finished. The process returns to the operations of the flowchart of FIG. 6.

In this case, the operation of step 109 in the flowchart of FIG. 6 is performed.

At step 109 of FIG. 6, target transmission gear ratio setting section 203 checks whether or not the pseudo accelerator opening degree To' is greater than the actual accelerator opening degree To.

In particular, target transmission gear ratio setting section 203 identifies the actual accelerator opening degree from the output signal of accelerator operation amount sensor 23. Target transmission gear ratio setting section 203 checks whether or not pseudo accelerator opening degree To' is greater than actual accelerator opening degree To by comparing the identified actual accelerator opening degree To, and pseudo accelerator opening degree To' calculated at the above-described step 108 (the calculation operation of the pseudo accelerator opening degree).

When pseudo accelerator opening degree To' is greater than actual accelerator opening degree To (when the answer of step 109 is affirmative (YES)), the accelerator pedal is not depressed again after the accelerator pedal is returned, or the accelerator opening degree is small although the accelerator pedal is depressed again after the accelerator pedal is returned.

In this case, the process proceeds to step 110. At step 110, the target rotational speed of the primary pulley and the target transmission gear ratio at the present time is set with reference to the shift diagram for the acceleration mode based on the pseudo accelerator opening degree and the vehicle speed.

Subsequently to step 110, the process proceeds to step 111. At step 111, shift control section 204 determines the primary pressure and the secondary pressure for performing the shift from the transmission gear ratio at the present time (the actual transmission gear ratio) to the target transmission gear ratio set at step 110. Shift control section 204 outputs, to hydraulic pressure control unit 30, a command to attain the determined primary pressure and the determined secondary pressure.

Accordingly, hydraulic pressure control unit 30 continuously varies the contact radii of V belt 13 with respect to primary pulley 11 and secondary pulley 12. The pulley ratio and the contact frictional force of V belt 13 is controlled to the values determined in accordance with the primary pressure and the secondary pressure.

With this, the actual transmission gear ratio is continuously varied toward the target transmission gear ratio. Finally, at the timing at which (when) the actual transmission gear ratio reaches the target transmission gear ratio, the shift control at step 111 is finished.

Then, when the shift control at step 111 is finished, the process returns to the operation of step 108. At step 108, pseudo accelerator opening degree To' is calculated again.

When pseudo accelerator opening degree To' is not greater than actual accelerator opening degree To at the above-described step 109, the process proceeds to step 112. At step 112, the target transmission gear ratio and the target rotational speed of the primary pulley at the present time are set with reference to the shift diagram for the acceleration mode based on the actual accelerator opening degree and the vehicle speed.

In this case, a case where the pseudo accelerator opening degree To' is not greater than actual accelerator opening degree To means 1) the accelerator pedal is depressed again after the accelerator pedal is returned, or 2) the accelerator pedal is not depressed again while pseudo accelerator opening degree To' reaches actual accelerator opening degree To by decreasing pseudo accelerator opening degree To' by the predetermined amount after the predetermined time period elapses from the timing at which actual opening degree To becomes smaller than acceleration mode cancel threshold value Th_d.

Besides, the operation of step 112 is also performed when it is judged that the vehicle does not run the uphill at the above-described step 106 (when the answer of step 106 is negative (NO)), and when it is judged that the accelerator opening degree is not decreased at step 107 (the answer of step 107 is negative (NO)).

Then, at step 113, shift control section 204 determines the primary pressure and the secondary pressure for performing the shift from the transmission gear ratio at the present time (the actual transmission gear ratio), to the target transmission gear ratio set at step 112. Shift control section 204 outputs, to hydraulic pressure control unit 30, a command for attaining the determined primary pressure and the determined secondary pressure.

Accordingly, hydraulic pressure control unit 30 continuously varies the contact radii of V belt 13 with respect to primary pulley 11 and secondary pulley 12, so that the pulley ratio and the contact frictional force of V belt 13 are controlled to the values determined in accordance with the primary pressure and the secondary pressure.

With this, the actual transmission gear ratio is continuously varied toward the target transmission gear ratio. Finally, at the timing at which the actual transmission gear ratio reaches the target transmission gear ratio, the shift control at step 113 is finished.

After the operation of step 113 is finished, at step 114, shift mode setting section 202 judges whether or not the cancel of the acceleration mode is needed.

In particular, when the target transmission gear ratio is set based on the actual accelerator opening degree, shift mode setting section 202 judges that the cancel of the acceleration mode is needed when the accelerator opening degree To at the present time is smaller than a predetermined value Th_d (To<Th_d).

In this case, predetermined value Th_d is a value defined in the map with respect to the vehicle speed at the present time, and accelerator opening degree To at the timing (step 101) at which it is judged that the driver has the acceleration intention. These relationship is defined in the mode judgment map.

Besides, predetermined value Th_d is smaller than predetermined value Th_a used when it is judged whether or not the driver has the acceleration intention.

When it is judged that the cancel of the acceleration mode is needed at step 114, the process returns to the above-described step 102. At step 102, the normal mode is set.

On the other hand, when it is not judged that the cancellation of the acceleration mode is needed at step 114, the driver continues to depress the accelerator pedal continuously. In this case, the process returns to the operation of step 106 for performing the shift control of the acceleration mode continuously.

Hereinafter, the variations of actual accelerator opening degree To and pseudo accelerator opening degree To' when the accelerator opening degree becomes 0 (zero) by the return of the accelerator pedal when the vehicle runs the uphill are illustrated.

Figure 8:
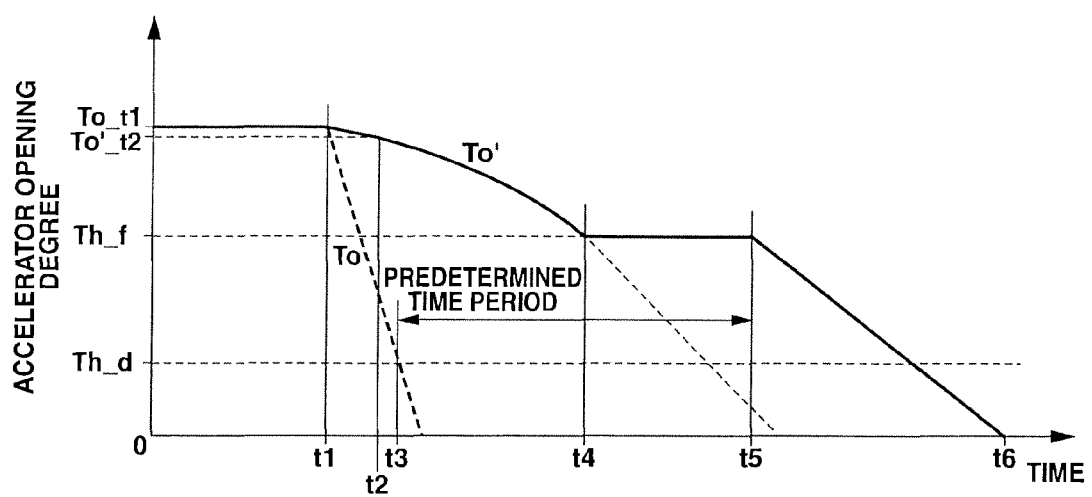
FIG. 8 is a time chart for illustrating the operation in the CVT control unit.
Figure 9:
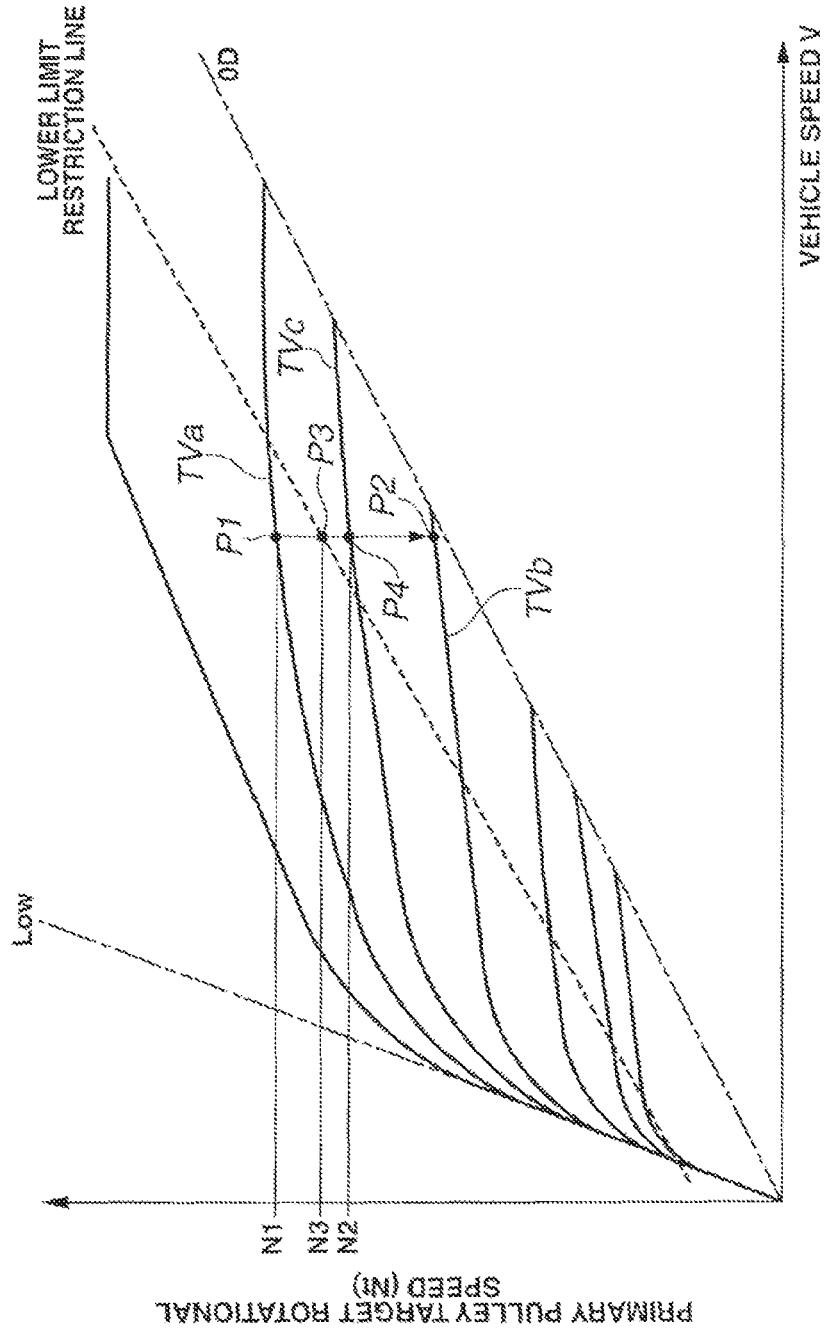
FIG. 9 is a view for illustrating a conventional shift control based on a shift diagram.

FIG. 8 is a time chart for illustrating the variations of actual accelerator opening degree To and pseudo accelerator opening degree To'.

When the accelerator pedal is returned when the vehicle runs the uphill in the acceleration mode, the answer of step 107 is affirmative (YES). Subsequently, after the time t1 at which the accelerator pedal is returned, the setting of the target rotational speed of the primary pulley and the target transmission gear ratio by using pseudo accelerator opening degree To', and the upshift according to the settings of the target rotational speed of the primary pulley and the target transmission gear ratio are started (steps 108-step 111).

In this case, pseudo accelerator opening degree To' after time t1 is calculated based on the time period elapsed from time t1, and the map determined in accordance with the road gradient and accelerator opening degree To_t1 at the time t1 at which the accelerator pedal is returned. In this embodiment, in the map, pseudo accelerator opening degree To' is set after time t1 to be decreased by the speed slower than the speed of the actual accelerator opening degree To. For example, at time t2, pseudo accelerator opening degree To' t2 is calculated.

On the other hand of the calculation of this pseudo accelerator opening degree To', when actual accelerator opening degree To becomes smaller than acceleration mode cancel threshold value Th_d, the judgment of step 201 in FIG. 7 is affirmed (YES) at that time t3. The value of timer T which defines the end timing of the setting of the target transmission gear ratio based on pseudo accelerator opening degree To' is set.

The calculation of the pseudo accelerator opening degree is performed based on the above-described map and the time period elapsed from time t1 (step 207) while the predetermined time period T elapses from the time t3 at which the actual accelerator opening degree To becomes smaller than acceleration mode cancel threshold value Th_d.

When the accelerator pedal is not depressed again while the calculation of the pseudo accelerator opening degree is performed, the pseudo accelerator opening degree continues to be slowly decreased, and then the pseudo accelerator opening degree reaches the lower limit value opening degree Th_f (time t4). Consequently, from that time t4 to time t5 after predetermined time period T elapses, the judgment of step 204 is denied, and the judgment of step 206 is affirmed. At step 208, pseudo accelerator opening degree To' is held to the lower limit value opening degree Th_f greater than actual accelerator opening degree To (=0 (zero)) (from time t4 to time t5).

Then, when predetermined time period T elapses, the judgment of step 204 in FIG. 7 is affirmed. At step 209, pseudo accelerator opening degree To' approaches (decreases) toward actual accelerator opening degree To by the predetermined gradient (from time t5 to time t6).

Accordingly, pseudo accelerator opening degree To' is larger than actual accelerator opening degree To during the time period from time t1 to time t6. Consequently, the judgment of step 109 in FIG. 6 is affirmed, and the setting of the target rotational speed of the primary pulley and the setting of the target transmission gear ratio are performed by pseudo accelerator opening degree To'.

In this case, pseudo accelerator opening degree To' is greater than actual accelerator opening degree To. Accordingly, while the target transmission gear ratio is set based on this pseudo accelerator opening degree To', the value of the target rotational speed of the primary pulley is held to the value higher than that in case of the actual accelerator opening degree. Accordingly, the target transmission gear ratio in this case is held to the transmission gear ratio larger than that in case where the target transmission gear ratio is set based on actual accelerator opening degree To.

Accordingly, in the upshift performed when the accelerator pedal is returned, the variation amount of the target transmission gear ratio in the upshift can become smaller in case where the target transmission gear ratio is set by using the pseudo transmission gear ratio (the upshift is not largely performed relative to a case of using the actual accelerator opening degree).

When the accelerator pedal is depressed again while the settings of the target transmission gear ratio and the target rotational speed of the primary pulley based on the pseudo accelerator opening degree To' are performed, the judgment of step 109 in FIG. 6 is denied, and the setting of the target rotational speed of the primary pulley and the setting of the target transmission gear ratio are performed by the actual accelerator opening degree.

Consequently, the downshift toward the target transmission gear ratio set by using the actual accelerator opening degree after the depression is started.

In this case, when the setting of the target transmission gear ratio before the accelerator pedal is depressed again is performed by using the pseudo accelerator opening degree, the target transmission gear ratio at that time is the value which is larger than the target transmission gear ratio in case of the actual accelerator opening degree (=0 (zero)), and which is near the target transmission gear ratio set by using the actual accelerator opening degree after the depression.

Accordingly, in the downshift performed when the accelerator pedal is depressed again, the variation amount of the target transmission gear ratio at the downshift can be smaller in a case where the target transmission gear ratio is set by using the pseudo accelerator opening degree before the accelerator pedal is depressed again (the downshift is largely performed relative to the case using the actual accelerator opening degree).

Accordingly, it is possible to reach the target transmission gear ratio after the depression of the accelerator pedal again, during the time period shorter than that in case of using the actual accelerator opening degree. Consequently, it is possible to improve the shift behavior of the automatic transmission when the vehicle runs the uphill, and to decrease the unnatural feeling of the driver with respect to the shift behavior.

As described above, the shift control apparatus (CVT control unit 20) for continuously variable transmission 10 arranged to continuously vary a rotational driving force of engine 1 which is inputted to primary pulley 11, and to transmit this varied rotational driving force to secondary pulley 12, the shift control apparatus includes target transmission gear ratio setting section 203 configured to set the target transmission gear ratio by referring to the map (FIG. 5) based on vehicle speed V and actual accelerator opening degree To identified from the output signal of accelerator operation amount sensor 23; shift control section 204 configured to control the shift of continuously variable transmission 10 toward the target transmission gear ratio; the judging section (uphill running judging section 205) configured to judge whether or not the vehicle runs the uphill; and pseudo accelerator opening degree generating section 206 configured to generate the pseudo accelerator opening degree To' which is larger than actual accelerator opening degree To when accelerator opening degree To is decreased when the judging section 206 judges that the vehicle runs the uphill, target transmission gear ratio setting section 203 being configured to set the target transmission gear ratio which is larger than the target transmission gear ratio set by using the actual accelerator opening degree, by using pseudo accelerator opening degree To' when pseudo accelerator opening degree To' is inputted, and shift control section 204 being configured to control the shift of the continuously variable transmission toward the target transmission gear ratio set based on the pseudo accelerator opening degree and the vehicle speed when the pseudo accelerator opening degree is generated, and to control the shift of the continuously variable transmission toward the target transmission gear ratio set based on the actual accelerator opening degree and the vehicle speed when the pseudo accelerator opening degree is not generated.

By this control configuration, the target transmission gear ratio is set by using the pseudo accelerator opening degree which is larger than the actual accelerator opening degree when the accelerator opening degree is decreased by the return of the accelerator pedal while the vehicle runs the uphill. Accordingly, the target transmission gear ratio of the continuously variable transmission becomes larger transmission gear ratio, relative to a case where the transmission gear ratio is set by using the actual accelerator opening degree.

Accordingly, in the downshift performed when the accelerator pedal is depressed again, the variation amount of the target transmission gear ratio at the downshift can be smaller in a case where the target transmission gear ratio is set by using the pseudo accelerator opening degree before the accelerator pedal is depressed again. With this, the transmission gear ratio of the continuously variable transmission can reach the target transmission gear ratio after the accelerator pedal is depressed again, during a shorter time period, relative to a case where the actual accelerator opening degree is used. Accordingly, it is possible to improve the shift behavior of the automatic transmission when the vehicle runs the uphill, and to decrease the unnatural feeling of the driver with respect to the shift behavior.

In particular, the pseudo accelerator opening degree generated by the pseudo accelerator opening degree generating section is decreased by the variation rate which is smaller (slower) than the variation rate of the actual accelerator opening degree. Accordingly, the variation (decrease) of the target transmission gear ratio in the upshift when the target transmission gear ratio is set by using the pseudo accelerator opening degree is slower (smaller) than the variation (decrease) of the transmission gear ratio in the upshift when the target transmission gear ratio is set by using the actual accelerator opening degree.

By the thus-constructed control configuration, when the accelerator opening degree is decreased by the return of the accelerator pedal while the vehicle runs the uphill, the target transmission gear ratio is set by using the pseudo accelerator opening degree which is slowly decreased relative to the actual accelerator opening degree. Accordingly, the transmission gear ratio is not linearly varied in accordance with the return of the accelerator pedal. The transmission gear ratio is slowly varied relative to the case where the target transmission gear ratio is set by using the actual accelerator opening degree.

Accordingly, the upshift is restricted. Consequently, the variation amount of the target transmission gear ratio of the target transmission gear ratio at the downshift can be smaller in a case where the target transmission gear ratio is set by using the pseudo accelerator opening degree before the accelerator pedal is depressed again.

With this, when the accelerator pedal is depressed again, the transmission gear ratio of the continuously variable transmission can reach the target transmission gear ratio after the accelerator pedal is depressed again, during a shorter time period relative to a case where the actual accelerator opening degree is used. Therefore, it is possible to improve the reacceleration when the vehicle runs the uphill. Accordingly, it is possible to decrease the unnatural feeling of the driver in the conventional apparatus, with respect to the shift behavior when the accelerator pedal is returned and depressed again while the vehicle runs the uphill.

In particular, the decrease rate of the pseudo accelerator opening degree is determined based on the road gradient and the actual accelerator opening degree at the timing at which the accelerator pedal is returned. Accordingly, it is possible to appropriately set the variation amount of the target transmission gear ratio at the upshift when the accelerator pedal is returned, in accordance with the accelerator operation of the driver. With this, it is possible to appropriately hold the target rotational speed of the primary pulley (the engine speed) when the accelerator pedal is returned, and to decrease the variation amount of the target transmission gear ratio at the downshift when the accelerator pedal is depressed again. Therefore, it is possible to further decrease the unnatural feeling of the driver with respect to the shift behavior.

In the pseudo accelerator opening degree, the lower limit value which is larger than the actual accelerator opening degree after the decrease (the decreased actual accelerator opening degree), and which is determined in accordance with the road gradient and the accelerator opening degree at the timing at which the accelerator opening degree is decreased is set. The pseudo accelerator opening degree generating section holds the pseudo accelerator opening degree to the lower limit value when the pseudo accelerator opening degree decreases and reaches the lower limit value.

By the thus-constructed control configuration, the pseudo accelerator opening degree is finally held to the lower limit value which is larger than the actual accelerator opening degree.

Even when the pseudo accelerator opening degree is slowly decreased, the pseudo accelerator opening degree may become the same value (for example, 0 (zero)) as the actual accelerator opening degree, during the short time period, when the accelerator opening degree at the timing of the return of the accelerator pedal is small.

By the above-constructed control configuration, it is possible to prevent the generation of the above-described problems. Even when the accelerator opening degree at the return of the accelerator pedal is small, the target transmission gear ratio is set larger than the target transmission gear ratio set by using the actual accelerator opening degree. Accordingly, it is possible to rapidly reach the target transmission gear ratio after the accelerator pedal is depressed again.

The shift control apparatus further includes acceleration intention judging section 201 configured to judge whether or not the driver has the acceleration intention, and shift mode setting section 202 configured to set the shift control of continuously variable transmission 10 to the acceleration mode in which the target rotational speed of primary pulley 11 is set to the higher rotation side than that of the normal mode when acceleration intention judging section 201 judges that the driver has the acceleration intention.

Pseudo accelerator opening degree generating section 206 is configured to generate the pseudo accelerator opening degree when the accelerator opening degree is decreased while the vehicle runs the uphill in the acceleration mode, and outputs the pseudo accelerator opening degree to target transmission gear ratio setting section 203.

By the thus-constructed control configuration, when the vehicle runs in the acceleration mode, the target rotational speed of primary pulley 11 is set to the higher rotation side relative to the normal mode. In the upshift performed when the accelerator pedal is returned, the target transmission gear ratio is largely varied relative to the normal mode (the upshift is largely performed relative to the normal mode).

Accordingly, in this case, when the target transmission gear ratio is set based on the pseudo accelerator opening degree, it is possible to preferably prevent that the target transmission gear ratio is largely varied (the upshift is largely performed) during the short time period. Accordingly, then, when the accelerator pedal is depressed, it is possible to further rapidly reach the target transmission gear ratio determined in accordance with the accelerator opening degree after the depression.

With this, it is possible to improve the shift behavior of the automatic transmission when the vehicle runs the uphill, and thereby to decrease the unnatural feeling of the driver with respect to the shift behavior.

Moreover, when accelerator opening degree To and predetermined value Th_a determined in accordance with the vehicle speed satisfies To≥Th_a, acceleration intention judging section 201 judges that the driver has the acceleration intention. Shift mode setting section 202 sets the shift control of the continuously variable transmission to the acceleration mode.

Pseudo accelerator opening degree generating section 206 (the accelerator opening degree generating section) ends the generation of pseudo accelerator opening degree To' in the acceleration mode, during the predetermined time period after actual accelerator opening degree To becomes smaller than acceleration mode cancel threshold value Th_d which is smaller than predetermined value Th_a (To<Th_d).

By the thus-constructed control configuration, for example, when the accelerator pedal is returned for the stop of the vehicle, it is possible to prevent that the vehicle cannot stop by holding pseudo accelerator opening degree To' to lower limit value opening degree Th_f, even though the accelerator pedal is not depressed again after the accelerator opening degree becomes 0 (zero) by the return of the accelerator pedal.

Pseudo accelerator opening degree generating section 206 is configured to gradually decrease pseudo accelerator opening degree To' toward actual accelerator opening degree To after the decrease by predetermined amount α after the predetermined time period elapses after the actual accelerator opening degree To becomes smaller than acceleration mode cancel threshold value Th_d. Pseudo accelerator opening degree generating section 206 is configured to end the generation of the pseudo accelerator opening degree at the timing at which pseudo accelerator opening degree To' reaches actual accelerator opening degree To after the decrease.

By the thus-constructed control configuration, it is possible to prevent the sudden variations of the target rotational speed of the primary pulley and the target transmission gear ratio, and to prevent the sudden upshift. Therefore, it is possible to prevent the driver from feeling the unnatural feeling with respect to the shift behavior.

Pseudo accelerator opening degree generating section 206 is configured to end the generation of pseudo accelerator opening degree To' at the timing at which actual accelerator opening degree To is increased from the actual accelerator opening degree (for example, 0 (zero)) to be greater than pseudo accelerator opening degree To'.

By the thus-constructed control configuration, it is possible to finish the upshift at the target transmission gear ratio set by using pseudo accelerator opening degree To', and to appropriately start the downshift at the target transmission gear ratio set by using the actual accelerator opening degree.

Moreover, in this case, when the actual accelerator opening degree after the accelerator pedal is depressed again is smaller than the accelerator opening degree when the accelerator pedal is returned, the setting of the target transmission gear ratio by using the pseudo accelerator opening degree is continued until the pseudo accelerator opening degree To' is decreased to become actual accelerator opening degree To after the accelerator pedal is depressed again.

Accordingly, the deviation between the target rotational speed of the primary pulley which is determined from the actual accelerator opening degree after the accelerator pedal is depressed again, and the target rotational speed determined by the lower limit restriction line is not generated, unlike the conventional apparatus in which the lower limit of the target rotational speed of the primary pulley is set by the lower limit restriction line. Therefore, it is possible to prevent the driver from feeling the unnatural feeling with respect to the shift behavior.

Moreover, acceleration intention judging section 201 judged that the driver has the acceleration intention when accelerator opening degree To, accelerator depression speed Tv, and predetermined values Th_a and Th_b determined in accordance with the vehicle speed satisfy To≥Th_a, and Tv≥Th_b.

By the thus-constructed control configuration, the predetermined values are varied in accordance with the vehicle speed. Accordingly, it is possible to appropriately judge whether or not the driver has the acceleration intention in a wider range from the low vehicle speed to the high vehicle speed.

Furthermore, in the above-described embodiment, lower limit value opening degree Th_f is determined in accordance with the road gradient and the accelerator opening degree when the accelerator pedal is returned. However, lower limit value opening degree Th_f may be set in accordance with the sport driving degree of the driver.

For example, the accelerator operation of the driver is monitored with time so as to obtain the inclination (tendency) of the accelerator operation of the driver. When the driver has high inclination of the acceleration of the vehicle (when the sport driving degree is high), it is preferable that the lower limit value opening degree Th_f is set larger relative to a case where the sport driving degree of the driver is not high.

In this case, in the downshift when the accelerator pedal is depressed again, it is possible to reach the target transmission gear ratio determined in accordance with the accelerator opening degree after the depression (the depressed accelerator opening degree) during the shorter time period, and thereby to provide the continuously variable transmission which has the good reacceleration.

In particular, in case of the driver having the high sport driving degree, when the accelerator pedal is depressed again, the accelerator opening degree tends to become larger. Accordingly, there is less possibility that the rotational speed of the primary pulley (the engine speed) when the accelerator pedal is depressed again becomes smaller than the rotational speed of the primary pulley (the engine speed) set by using the pseudo accelerator opening degree. Therefore, it is possible to set lower limit value opening degree Th_f to the higher value.

With this, it is possible to prevent the unnatural feeling of the driver with respect to the shift behavior, and to provide the continuously variable transmission which has the good driving performance (the good acceleration performance).

In the above-described embodiment, the road gradient is calculated based on the output signal of G sensor 24. However, for example, the road gradient may be calculated from the engine torque, the vehicle speed, and the acceleration. In this case, the road gradient can be calculated regardless of G sensor 24. Accordingly, it is possible to decrease the manufacturing cost of the shift control apparatus of the continuously variable transmission.

The above-described embodiment exemplifies the control apparatus for the continuously variable transmission provided with the shift diagrams for the normal mode and the acceleration mode. Moreover, the present invention is applicable to a control apparatus for a continuously variable transmission having a driving mode (for example, snow mode) which uses a shift diagram in which a shift line suited for (running on) a snowy road.

In a case where the target rotational speed of the primary pulley and the target transmission gear ratio are set by using the pseudo accelerator opening degree, the target transmission gear ratio at the shift is not largely varied, relative to a case where the target rotational speed of the primary pulley and the target transmission gear ratio are set by using the actual accelerator opening degree. Accordingly, it is possible to attain the stable running on the snowy road.

In the embodiment, the continuously variable transmission is the belt type continuously transmission. However, the present invention is applicable to a troidal continuously variable transmission.

The entire contents of Japanese Patent Application No. 2011-284077 filed Dec. 26, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A shift control apparatus for a continuously variable transmission of a vehicle which is configured to continuously vary a rotational driving force of an engine that is inputted to an input side rotational member, and to transmit the varied rotational driving force to an output side rotational member, the shift control apparatus comprising:
a target transmission gear ratio setting section configured to set a target transmission gear ratio based on an actual accelerator opening degree which is identified from an output signal of an accelerator operation amount sensor, and a vehicle speed;
a shift control section configured to control a shift of the continuously variable transmission toward the target transmission gear ratio;
a judging section configured to judge whether or not the vehicle runs an uphill; and
a pseudo accelerator opening degree generating section configured to generate a pseudo accelerator opening degree which is larger than the actual accelerator opening degree when the actual accelerator opening degree is decreased when the judging section judges that the vehicle runs the uphill, and to output the pseudo accelerator opening degree to the target transmission gear ratio setting section,
the target transmission gear ratio setting section being configured to set the target transmission gear ratio by using the pseudo accelerator opening degree when the pseudo accelerator opening degree is inputted, and
the shift control section being configured to control the shift of the continuously variable transmission toward the target transmission gear ratio set based on the pseudo accelerator opening degree and the vehicle speed when the pseudo accelerator opening degree is generated, and to control the shift of the continuously variable transmission toward the target transmission gear ratio set based on the actual accelerator opening degree and the vehicle speed when the pseudo accelerator opening degree is not generated.

2. The shift control apparatus as claimed in claim 1, wherein the pseudo accelerator opening degree generated by the pseudo accelerator opening degree generating section is decreased at a variation rate which is slower than a variation rate of the actual accelerator opening degree.

3. The shift control apparatus as claimed in claim 2, wherein the pseudo accelerator opening degree has a lower limit value which is larger than the decreased actual accelerator opening degree; and the pseudo accelerator opening degree generating section is configured to hold the pseudo accelerator opening degree to the lower limit value after the pseudo accelerator opening degree is decreased to be the lower limit value.

4. The shift control apparatus as claimed in claim 1, wherein the shift control apparatus further comprises an acceleration intention judging section configured to judge whether or not a driver has an acceleration intention, and a shift mode setting section configured to set the shift control of the continuously variable transmission to an acceleration mode in which the target rotational speed of the input side rotation member is set to a higher rotation side than the target rotational speed of the input side rotation member in a normal mode when the acceleration intention judging section judges that the driver has the acceleration intention; and the pseudo accelerator opening degree generating section is configured to generate the pseudo accelerator opening degree when the actual accelerator opening degree is decreased while the vehicle runs the uphill in the acceleration mode, and to output the pseudo accelerator opening degree to the target transmission gear ratio setting section.

5. The shift control apparatus as claimed in claim 1, wherein the pseudo accelerator opening degree generating section is configured to end the generation of the pseudo accelerator opening degree during a predetermined time period.

6. The shift control apparatus as claimed in claim 5, wherein the pseudo accelerator opening degree generating section is configured to end the generation of the pseudo accelerator opening degree during the predetermined time period after the actual accelerator opening degree becomes smaller than a threshold value for judging a cancel of the acceleration mode.

7. The shift control apparatus as claimed in claim 6, wherein when the pseudo accelerator opening degree generating section ends the generation of the pseudo accelerator opening degree during the predetermined time period, the pseudo accelerator opening degree generating section is configured to decrease the pseudo accelerator opening degree toward the decreased actual accelerator opening degree after the decrease by a predetermined amount after the predetermined time period elapses, and to end the generation of the pseudo accelerator opening degree when the pseudo accelerator opening degree reaches the decreased actual accelerator opening degree.

8. The shift control apparatus as claimed in claim 1, wherein the pseudo accelerator opening degree generating section is configured to end the generation of the pseudo accelerator opening degree when the actual accelerator opening degree is increased from the decreased actual accelerator opening degree to become greater than the pseudo accelerator opening degree.

* * * * *